F. CARROLL.
LEMON SQUEEZER.
APPLICATION FILED SEPT. 9, 1910.
986,800.
Patented Mar. 14, 1911.
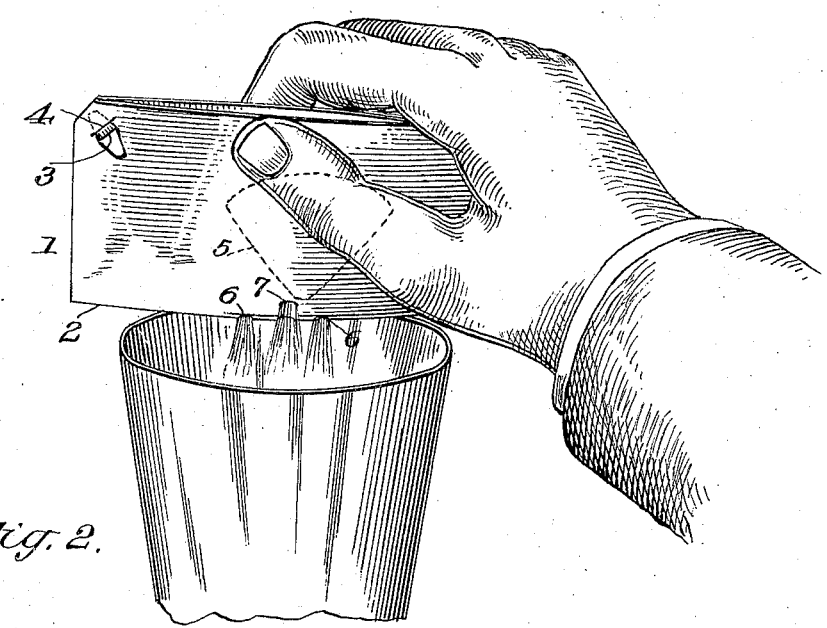
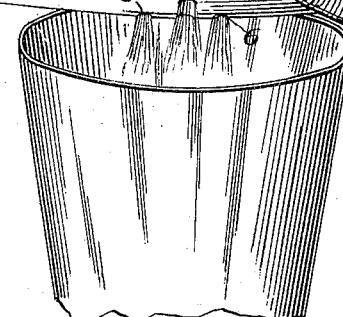
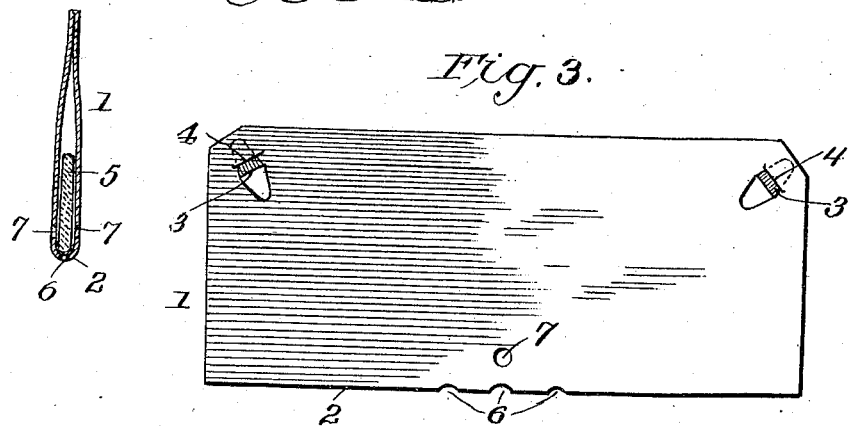
Inventor
Frank Carroll
Witnesses
Edna H. Thomas
L. D. Lindsay
By Greeley & McIntire
Attorneys

UNITED STATES PATENT OFFICE.

FRANK CARROLL, OF EL PASO, TEXAS.

LEMON-SQUEEZER.

986,800.

Specification of Letters Patent.   Patented Mar. 14, 1911.

Application filed September 9, 1910. Serial No. 581,309.

*To all whom it may concern:*

Be it known that I, FRANK CARROLL, a citizen of the United States, residing at El Paso, in the county of El Paso and State of Texas, have invented certain new and useful Improvements in Lemon-Squeezers; and I do hereby declare the following to be a full, clear, and exact description of the invention, such as will enable others skilled in the art to which it appertains to make and use the same.

This invention relates to improvements in lemon squeezers.

The object of the invention is to provide a squeezer for table purposes, where a slice of lemon is served with food, whereby to prevent the juice "splattering" and the seeds falling.

A further object of the invention is to provide a sanitary lemon squeezer, in that a person's fingers do not come into direct contact with the lemon when squeezing the juice on the food.

The invention also comprehends improvements in the specific details of construction and arrangement of parts, which will be hereinafter described and particularly pointed out in the claims.

In the drawings: Figure 1 is a perspective view of my improved lemon squeezer, illustrating it in use. Fig. 2 is a transverse section of the lemon squeezer. Fig. 3 is a side elevation of the same.

1 indicates my improved lemon squeezer, comprising a flexible sheet folded on the line 2, and having its ends brought together and permanently secured in any suitable manner. I have, however, shown tongues 3, cut from the sheet and folded, and then passed through cuts 4, which bind the free ends of the sheets together. It will be obvious however, that other means may be employed for securing the ends of the sheet. When the sheet is folded, it forms an envelop, or compartment in which a slice of lemon may be inserted, as shown in Fig. 1. In the bottom of the envelop at the fold line thereof, are a series of perforations 6, for the passage of the juice. Other openings 7, may be provided, whereby to permit free and uninterrupted flow of the liquid.

In use, a slice of lemon, with its raw edge down, is slipped in the end of the envelop, and served in this manner. The envelop is then held between the fingers, as indicated in Fig. 1, and squeezed, when the juice will pass through the openings 6 and 7. By confining the lemon, the juice will not splatter when being squeezed, nor will the seeds fall into the food. Furthermore, the fingers will not come into contact with the lemon, so that the device is sanitary.

The envelop may be formed of any suitable fiber, or other material of a flexible nature.

The invention is extremely simple, and from an economical and sanitary standpoint, the construction is such as will produce an effective squeezer.

Having thus described my invention, what I claim is:

1. A lemon squeezer comprising an envelop to receive a slice of lemon, said envelop formed of one sheet of material having openings for the passage of juice when the lemon is squeezed.

2. A lemon squeezer comprising a sheet folded upon itself and formed with openings, and means for securing the free ends of the sheet together.

3. A lemon squeezer comprising a sheet folded upon itself, and formed with openings and slots, tongues stamped from the sheet and folded and passed through the slots to hold the free ends of the sheet together.

4. A lemon squeezer comprising an envelop made of one sheet of material formed with openings in its bottom, means for securing the corners of the envelop together, the said envelop being open at the top between the means for securing the corners together.

In testimony whereof I affix my signature in presence of two witnesses.

FRANK CARROLL.

Witnesses:
  H. A. BROCKMOLEN,
  M. D. GAYLORD.

---

Copies of this patent may be obtained for five cents each, by addressing the "Commissioner of Patents, Washington, D. C."